March 10, 1959 P. M. AGTERGAEL 2,876,713
DOUGH DIVIDING MACHINE
Filed Dec. 12, 1957 2 Sheets-Sheet 1
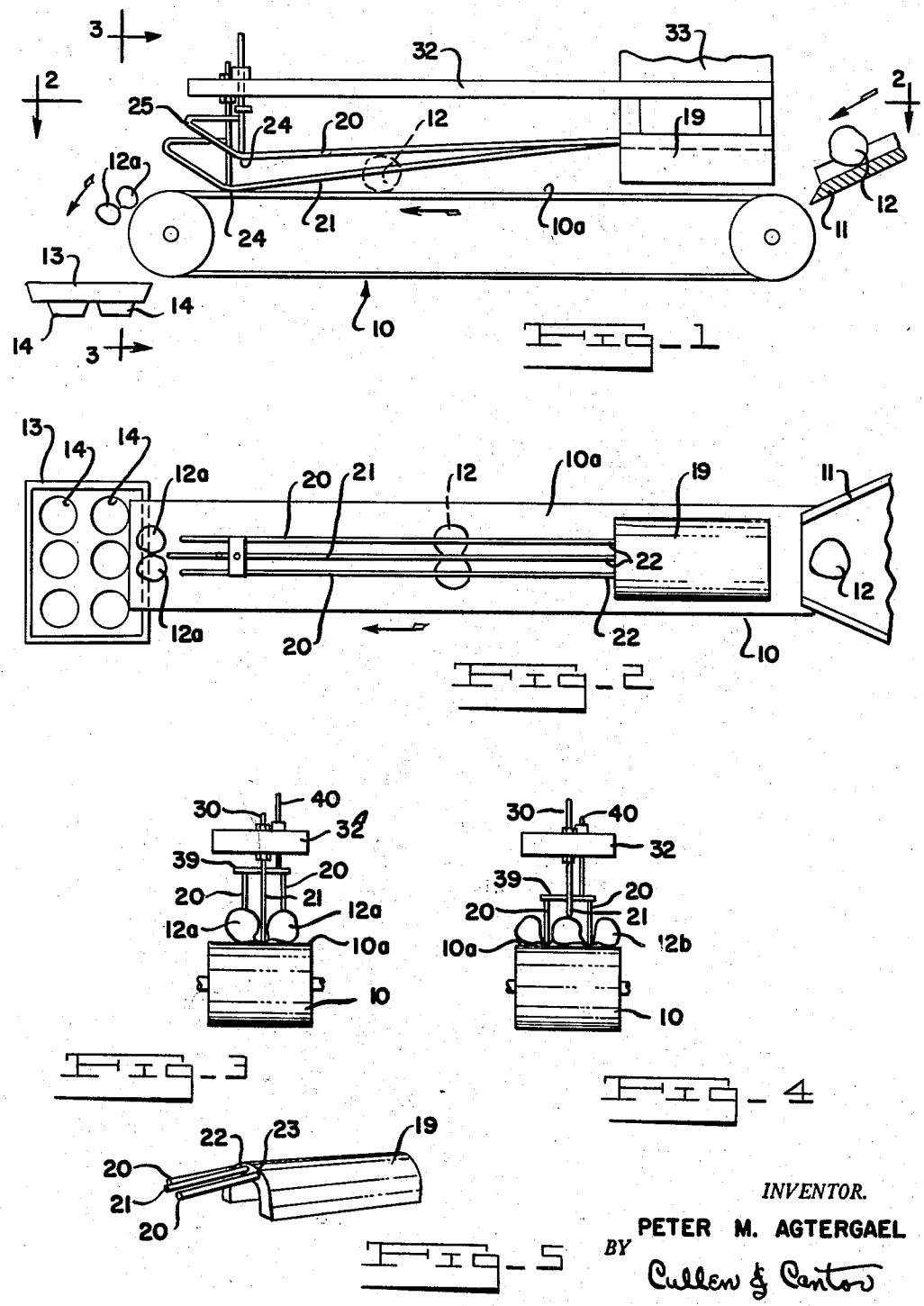
INVENTOR.
PETER M. AGTERGAEL
BY Cullen & Cantor
ATTORNEYS

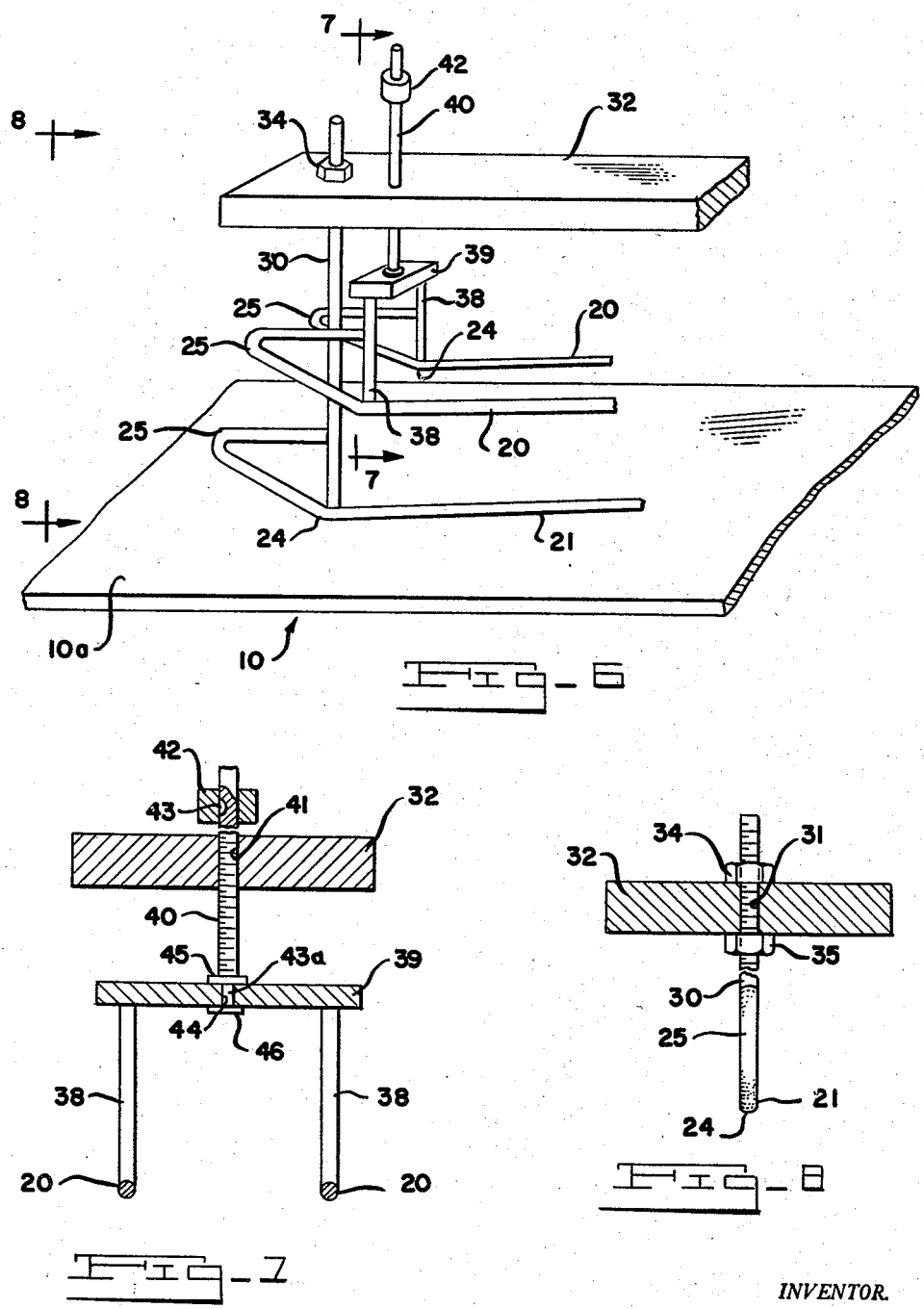

United States Patent Office 2,876,713
Patented Mar. 10, 1959

2,876,713

DOUGH DIVIDING MACHINE

Peter M. Agtergael, Detroit, Mich.

Application December 12, 1957, Serial No. 702,375

4 Claims. (Cl. 107—9)

This invention relates to a dough dividing machine and more particularly to a machine useful for dividing balls of dough in the mass production of certain types of baked rolls.

In the baking of rolls of the type known as "brown and serve" and also "clover leaf," balls of dough are first prepared, with the balls being of the proper weight and consistency. Thereafter, each ball of dough is divided into two parts for a "brown and serve" roll or three parts for a "clover leaf" roll and the parts are baked in contact with one another in baking cups so that the final roll consists of two or three parts, respectively, baked together to form the desired roll.

It is desirable to divide the original ball of dough into smaller balls of dough of equal size and shape and to accomplish this at high speed for production purposes. One of the major problems encountered in dividing the original ball of dough is that the dough, being sticky, will stick to almost any sharp knife or most other types of cutting devices.

One machine on the market is arranged to divide the ball of dough into two parts by the use of a relatively thick piece of wire, but even wiith this machine, the divided parts tend to stick within the dividing machine and to clog up the machine, and thus, to periodically stop production.

Therefore, it is an object of this invention to form a dividing machine which will divide a ball of dough selectively into two smaller balls or three smaller balls for either "brown and serve" or for "clover leaf" rolls. Further, the machine herein is arranged to divide the balls at top speed and without any possibility of sticking or gumming within the machine. In addition, the small balls are of equal size and are shaped into balls as is desirable.

A further object of this invention is to form a dividing machine wherein three parallel wires are used for dividing, with the wires being used either with the center wire doing the dividing and with the two outside wires functioning as guides or vice versa with the two outside wires acting as the dividers and the center wire acting as a guide, to thereby divide the ball into two parts or three parts respectively.

These and other objects and advantages of this invention will become apparent upon reading the following description of which the attached drawings form a part.

With reference to the attached drawings, in which:

Fig. 1 is a side elevation view and shows the center wire in its down or divider position and the outside wires raised into their guide position.

Fig. 2 is a top view of Fig. 1 taken in the direction of arrows 2—2 on Fig. 1.

Fig. 3 is an end view taken in the direction of arrows 3—3 of Fig. 1 and showing the center wire functioning as a divider and the two outside wires functioning as guides.

Fig. 4 is a view similar to Fig. 3, but with the outside wires acting as dividers and the center wire acting as a guide.

Fig. 5 is a view, in perspective, of the conveyor guide and shows the wire ends anchored in the guide.

Fig. 6 is a fragmentary perspective view of the front end of the wires and illustrates the adjustment means for raising and lowering the wires.

Figs. 7 and 8 are views taken on arrows 7—7 and 8—8 of Fig. 6 and show the outside wire height adjustment means and the center wire adjustment means respectively.

With reference to Fig. 1, the assembly includes a movable conveyor belt 10 having a top dough supporting surface 10a which travels from right to left (with the right side being designated as the rear of the conveyor). A slide 11 is arranged at the rear of the conveyor and a ball of dough 12 rolls down the slide and onto the top surface 10a of the conveyor 10. This ball of dough has already been properly weighed and is of the proper size and form and is ready to be divided and then baked.

The ball of dough 12 is carried on the top surface 10a of the conveyor and is divided on this top surface by means to be described below. Thereafter, the divided or smaller balls 12a roll off the front end of the conveyor and into a baking tray 13 having cups or depressions 14. The two balls 12a fall into one cup wherein they are side by side and in contact with one another. After all the cups are filled, each with two balls, the tray is taken away and is baked into the usual manner to form "brown and serve" rolls.

*The dividing means*

A guide 19, in the form of a half cylinder is provided at the rear of the conveyor 10 so that the ball of dough 12 when rolling on the conveyor, rolls through the guide because of the action of the moving conveyor. The actual dividing of the ball into smaller balls is accomplished by means of dividers in the form of springy wires 20 and 21, with the two outside wires being labeled 20 and the center wire being labeled 21. The rear ends 22 of these wires are fixed into sockets or drilled openings 23 formed in the guide 19 so that the said rear ends are fixed in position at a considerable distance above the top surface 10a of the conveyor.

The front ends 24 of the outside wires 20 and center wire 21 are arranged to be selectively lowered into contact with or closely adjacent to the top surface 10a of the conveyor. In addition, the wires each are provided with a front return bend 25 for the purposes of rigidifying their front ends.

To raise and lower the front end of the center divider wire 21, an upstanding rod 30 (see Figs. 6 and 8) is provided with its lower end welded or otherwise permanently joined to the front end 24 of wire 21 and also welded to the return bend 25. The rod passes through an opening 31 in a support beam 32. The support beam runs substantially the length of the conveyor and is supported at its rear end by a suitable support 33 (see Fig. 1). Note, the guide 19 is carried by suitable brackets connected to the support beam. The rod 30 is threaded at its top and is provided with a nut 34 whereby, the nut may be tightened upon the rod by threading, to thus lift the rod upwards and thereby lift the front end 24 of the center wire 21 upwards. A second nut 35, below the support beam, locks the rod in position. The movement of the wire is possible due to the springiness of the wire.

The front ends of the outside wires 20 are vertically adjustable by a means (see Figs. 6 and 7) comprising a pair of upstanding rods 38 welded to the front ends 24 and also to the return bends 25 of said wires 20 and then connected to a cross plate 39. Secured to the cross plate and extending upwardly is a rod 40 which is threaded at its top and extends through a threaded opening 41 in the support beam 32. A knob 42 is keyed at 43 to the rod 40. The lower end 43a of the rod is swivelly inserted in an opening 44 in plate 39 and is held to the plate by a pair of collars 45 and 46. Thus, turning the knob 42 causes the rod 40 to thread up or down relative to the threaded opening 41 in the support 42 to thereby raise or lower the plate 39 and the outside wires 20.

Where desired, the cross plate 39 may be eliminated, and the rods 38 may be extended upwards through the support beam and each may be provided with threaded nuts in the same manner as described relative to the center wire.

Operation

In ordinary operation, the operator either lowers the center divider wire and raises the two outside wires or vice versa, depending upon whether he is to run "brown and serve" rolls or "clover leaf" rolls. Thus, with reference to Figs. 1 and 3, a ball of dough 12 rolls on top of the conveyor 10a and is carried along from rear to front of the conveyor. As the dough is brought into contact with the center wire 21, which is the lowered wire, the ball continues rotating due to the action of the conveyor belt moving forwards and the retarding action of the sloping or angularly adjusted center wire. At the same time, the wire gradually divides the dough until the front end of the wire 24 is reached where the maximum division of the dough is accomplished. By the time the dough ball reaches that maximum point 24, it has been divided into two separate balls each being ball shaped.

If the center wire is arranged so that its front end is in tight contact with the top surface 10a of the conveyor, the two balls 12a will be severed. However, at times it is desirable to maintain the balls in a connected relationship, and therefore, the front end 24 of the center wire may be left a slight distance above the top surface 10a wherein a connecting cord of dough (see Fig. 3) will interconnect the two balls 12a. During this time, the two outside divider wires 20 are spaced above the conveyor belt 10a and form guides to contact the tops of the two smaller balls 12a and prevent these balls from rising up above the conveyor 10a and thus, sticking and gumming within the machine.

After the two balls are divided, they are carried off the conveyor into the baking pan 13 which is taken away to the baking oven.

To form "clover leaf" rolls (see Fig. 4), the center wire 21 is raised and the two outside wires 20 are lowered toward the belt wherein the ball of dough 12 is gradually divided into three smaller balls 12b which may be completely severed or interconnected by a thin cord of dough in the same way as mentioned above. In this case, the two outside wires function to divide the ball gradually so that the divided parts are rolled into ball shape by the time that they reach the ends 24 of the two outside wires and the center wire functions as a guide for the center of the three balls of dough. Thus, the center ball of dough is prevented from rising up above the belt and is guided.

This invention may be further developed within the scope of the following attached claims. Accordingly, it is desired that the foregoing description be read as being merely illustrative of an operative embodiment of this invention and not in a strictly limiting sense.

I now claim:

1. A dough divider for dividing a single ball of dough into either two or three equal size balls of dough, comprising a conveyor having a continually moving top surface upon which a ball of dough may be carried, with the top surface having a rear and a front, and the direction of movement being from rear to front; three dividers, a center divider and two outside dividers, each in the form of a wire, arranged side by side above said top surface and in planes parallel to one another and normal to the top surface and extending in the direction of movement of the top surface, with the rear ends of the wires each being fixed at a predetermined, considerable distance above the rear of the surface, and adjustment means secured to the front end of each of the wires for selectively lowering and fixing the center wire front end into contact with the surface and for fixing the front ends of the two outside wires at a predetermined distance above the surface, wherein the center divider divides the dough ball into two balls with the outside dividers each contacting the top of one of the dough balls or alternatively for lowering and fixing the front ends of the outside wires in contact with the surface and for fixing the front end of center wire a distance above the surface, wherein the outside wires divide the dough ball into three balls with the center wire in contact with the top of the center of the three balls formed.

2. A construction as defined in claim 1, wherein the divider wires are straight and are of a springy material wherein the wires, when arranged with their front ends in contact with the top surface form an acute angle relative to the top surface, and wherein the wires may be bent about their fixed rear end for raising and lowering their front ends.

3. A construction as defined in claim 1, and wherein the adjustment means comprises upstanding rods, each having a lower end connected to the front end of a wire and an upper end engaged with a support plate and having nut means threadedly connected to said upper ends and arranged when tightened, to pull the rods and wire ends upwards towards the support.

4. A construction as defined in claim 1, and wherein the adjustment means comprises upstanding rods each having a lower end connected to a front end of one wire and with the upper ends of the rods connected to the outside divider wires being interconnected by a plate, a support with which the center divider rod is movably engaged and means movably engaging the plate to the support.

References Cited in the file of this patent

UNITED STATES PATENTS

| | | |
|---|---|---|
| 1,945,073 | Raith | Jan. 30, 1934 |
| 2,017,281 | Kirchhoff | Oct. 15, 1935 |
| 2,243,338 | Harber | May 27, 1941 |